(12) United States Patent
Sugawara et al.

(10) Patent No.: US 7,531,257 B2
(45) Date of Patent: May 12, 2009

(54) FUEL CELL SYSTEM PROGRAMMED TO CONTROL REACTANT GAS FLOW IN A GAS CIRCULATION PATH

(75) Inventors: Tatsuya Sugawara, Utsunomiya (JP); Kouji Miyano, Utsunomiya (JP); Hiroshi Shimanuki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 684 days.

(21) Appl. No.: 10/714,065

(22) Filed: Nov. 14, 2003

(65) Prior Publication Data

US 2004/0219406 A1 Nov. 4, 2004

(30) Foreign Application Priority Data

Nov. 15, 2002 (JP) ............... 2002-332183

(51) Int. Cl.
*H01M 8/04* (2006.01)
(52) U.S. Cl. .......................... 429/22; 429/17
(58) Field of Classification Search ............ 429/17, 429/22
See application file for complete search history.

(56) References Cited

U.S. PATENT DOCUMENTS

| | | | | |
|---|---|---|---|---|
| 4,693,945 A | * | 9/1987 | Ohyauchi et al. ............ 429/21 |
| 5,441,821 A | * | 8/1995 | Merritt et al. ............... 429/17 |
| 6,844,094 B2 | * | 1/2005 | Kobayashi et al. ........... 429/25 |
| 2002/0136942 A1 | * | 9/2002 | Kashiwagi ................... 429/34 |
| 2003/0148167 A1 | * | 8/2003 | Sugawara et al. ............ 429/34 |

FOREIGN PATENT DOCUMENTS

| | | | |
|---|---|---|---|
| JP | 58-030075 | | 2/1983 |
| JP | 07-240220 | | 9/1995 |
| JP | 2002-33110 | * | 1/2002 |

* cited by examiner

*Primary Examiner*—Mark Ruthkosky
(74) *Attorney, Agent, or Firm*—Lahive & Cockfield, LLP; Anthony A. Laurentano

(57) ABSTRACT

A fuel cell system includes a fuel cell for generating power by being supplied with a fuel gas and an oxidizing gas, a fuel gas supply path for supplying a fuel gas to the fuel cell, a fuel off-gas circulation path for returning a fuel off-gas discharged from the fuel cell to the fuel gas supply path, an ejector, provided in the fuel gas supply path and driven by fluid flow energy, for supplying the fuel off-gas in the fuel off-gas circulation path flow to the fuel gas supply path, a fuel pump, provided in the fuel off-gas circulation path or on the fuel gas supply path and downstream with respect to the ejector, and driven by a rotating machine, for pressurizing the fuel off-gas, a discharge valve for discharging the fuel off-gas from the fuel off-gas circulation path; and a control device operatively connected to the fuel pump and to the discharge valve.

5 Claims, 7 Drawing Sheets

FUEL CELL SYSTEM PROGRAMMED TO CONTROL REACTANT GAS FLOW IN A GAS CIRCULATION PATH

BACKGROUND OF THE INVENTION

1. Field of the Invention

The present invention relates to a fuel cell system employed in a fuel cell-powered vehicle or the like, and relates to an operation method therefor.

Priority is claimed on Japanese Patent Application No. 2002-332183, filed Nov. 15, 2002, the content of which is incorporated herein by reference.

2. Description of Related Art

As a type of fuel cell to be installed in a fuel cell powered vehicle, a fuel cell is known which includes a fuel cell unit having an anode and a cathode that together sandwich a solid polymer electrolyte membrane therebetween, and in which a fuel gas (e.g., hydrogen gas) is supplied to the anode, and an oxidizing gas (e.g., oxygen or air) is supplied to the cathode so that electrochemical energy produced in an oxidation-reduction reaction of these reaction gases is directly output as electrical energy.

Because an anode off-gas (hereinafter referred to as a hydrogen off-gas) discharged from the anode side of the fuel cell includes unreacted hydrogen, fuel economy is reduced when such a hydrogen off-gas is expelled as it is. Accordingly, in order to improve fuel economy, a type of fuel cell system has been proposed in which the hydrogen off-gas is actively circulated, is mixed with a fresh hydrogen gas, and is resupplied to the fuel cell.

For example, Japanese Unexamined Patent Application, First Publication No. S58-30075 discloses a fuel cell system in which a hydrogen off-gas is circulated using an ejector (an ejector pump) so that the hydrogen off-gas is resupplied to the fuel cell.

Moreover, Japanese Unexamined Patent Application, First Publication No. H07-240220 discloses a fuel cell system in which a hydrogen gas is recycled by providing a pump or compressor in a circulation path for the hydrogen gas and by operating the pump or compressor.

However, in the above-mentioned fuel cell system provided with the ejector, a problem is encountered upon starting the fuel cell system. More specifically, in order to circulate the hydrogen gas using the ejector, flow of the hydrogen gas must be produced in the circulation path; therefore, when there is no hydrogen gas flow in the circulation path at starting or the like of the fuel cell system, a forced flow of the hydrogen gas must be produced in the circulation path. When hydrogen is purged from the hydrogen circulation path in order to produce the forced flow, a problem is encountered in that fuel economy is reduced because unreacted hydrogen gas is discharged from the circulation path.

On the other hand, in the above-mentioned fuel cell system provided with the pump or compressor, because the pump or compressor must be continuously operated during circulation of the hydrogen gas, electrical power for operating the pump or compressor is continuously consumed, and thus, a problem is encountered in that fuel economy is reduced by an amount corresponding to the consumed electrical power.

SUMMARY OF THE INVENTION

The present invention was conceived in view of the above circumstances, and objects thereof are to provide a fuel cell system in which a fuel gas can be efficiently used, and thereby fuel economy can be improved, and to provide an operation method therefor.

In order to achieve the above objects, the present invention provides a fuel cell system including: a fuel cell for generating power by being supplied with a fuel gas and an oxidizing gas; a fuel gas supply path for supplying a fuel gas to the fuel cell; a fuel off-gas circulation path for returning a fuel off-gas discharged from the fuel cell to the fuel gas supply path; an ejector, provided in the fuel gas supply path and driven by fluid flow energy, for supplying the fuel off-gas in the fuel off-gas circulation path flow to the fuel gas supply path; a fuel pump, provided in the fuel off-gas circulation path or on the fuel gas supply path and downstream with respect to the ejector, and driven by a rotating machine, for pressurizing the fuel off-gas; a discharge valve for discharging the fuel off-gas from the fuel off-gas circulation path; and a control device operatively connected to the fuel pump and to the discharge valve.

According to the above fuel cell system, even when there is no flow in the circulation path at starting or the like of the fuel cell system, unreacted fuel gas contained in the off-gas can be supplied to the fuel cell by operating the fuel pump in a state in which the discharge valve is closed. In addition, once a flow of the fuel gas is produced in the circulation path by operating the pump, the fuel off-gas in the circulation path can be supplied to the fuel gas supply path by using the ejector. Because the pump is required merely to produce a flow of the fuel gas, the pump may be of a small size, and electrical power for operating the pump can be reduced. As a result, even when there is no flow in the circulation path at starting or the like of the fuel cell system, the fuel gas can be efficiently used without being discharged to the outside, and fuel economy can be improved.

The above fuel cell system may further include a voltage measuring device, connected to the control device, for measuring voltage of cells constituting the fuel cell. The control device may preferably be adapted to control the discharge valve so as to be opened and closed depending on the voltage of the cells measured by the voltage measuring device.

According to the above fuel cell system, the concentration of the fuel in the off-gas is estimated based on the voltage of the cells measured by the voltage measuring device, and when it is determined that the concentration of the fuel is greater than a predetermined value, the discharge valve is closed so that the off-gas is circulated, and in contrast, when it is determined that the concentration of the fuel is less than the predetermined value, the discharge valve is opened so that the off-gas is discharged. As a result, the fuel contained in the off-gas can be efficiently used. In addition, because the pump is operated only when the concentration of the fuel is greater than a predetermined value, electrical power for operating the pump can be saved, and an efficient operation can be achieved.

The above fuel cell system may further include a state-of-load measuring device, connected to the control device, for measuring a state-of-load of the fuel pump. The control device may preferably be adapted to control the discharge valve so as to be opened and closed depending on the state-of-load measured by the state-of-load measuring device.

According to the above fuel cell system, the concentration of an impure gas (gas other than the fuel gas, which mainly includes a nitrogen gas) in the fuel off-gas can be estimated depending on the state-of-load of the fuel pump measured by the state-of-load measuring device. As a result, by controlling the discharge valve so as to be opened when the concentration of the impure gas reaches a predetermined concentration, the off-gas having the impure gas at a high concentration can be purged. By the purging operation, high load state of the fuel pump due to the impure gas can be reduced, and the fuel pump can be preferably protected.

The present invention further provides a method for operating a fuel cell system which includes: a fuel cell for generating power by being supplied with a fuel gas and an oxidizing gas; a fuel gas supply path for supplying a fuel gas to the fuel cell; a fuel off-gas circulation path for returning a fuel off-gas discharged from the fuel cell to the fuel gas supply path; an ejector, provided in the fuel gas supply path and driven by fluid flow energy, for supplying the fuel off-gas in the fuel off-gas circulation path flow to the fuel gas supply path; a fuel pump, provided in the fuel off-gas circulation path or on the fuel gas supply path and downstream with respect to the ejector, and driven by a rotating machine, for pressurizing the fuel off-gas; a discharge valve for discharging the fuel off-gas from the fuel off-gas circulation path; and a control device operatively connected to the fuel pump and to the discharge valve. The method includes the steps of: closing the discharge valve upon starting of the fuel cell; and operating the fuel pump when the discharge valve is in a closed state.

According to the above operation method, at least at starting in which flow is not produced by only using the ejector, because the fuel pump is operated in a state in which the discharge valve is closed so that useless discharge of the fuel due to flow in the circulation path produced by opening the discharge valve can be avoided, the fuel can be efficiently used. By applying this method to a vehicle provided with the fuel cell system, fuel economy can be improved due to efficient use of fuel.

The above method may further include the steps of: opening the discharge valve when a voltage of cells measured by a voltage measuring device is lower than or equal to a predetermined value when a predetermined time has passed since the fuel cell is started; and closing the discharge valve when the voltage of the cells exceeds the predetermined value after the discharge valve is opened.

The above method may further include the steps of: opening the discharge valve when a concentration of nitrogen measured by a nitrogen concentration measuring device is greater than or equal to a predetermined value when a predetermined time has passed since the fuel cell is started; and closing the discharge valve when a voltage of cells exceeds a predetermined value after the discharge valve is opened.

The nitrogen concentration measuring device may be constituted by a state-of-load measuring device for measuring a state-of-load of the fuel pump.

DETAILED DESCRIPTION OF THE INVENTION

First, a first embodiment of the fuel cell system according to the present invention will be explained with reference to FIG. 1.

Figure 1:
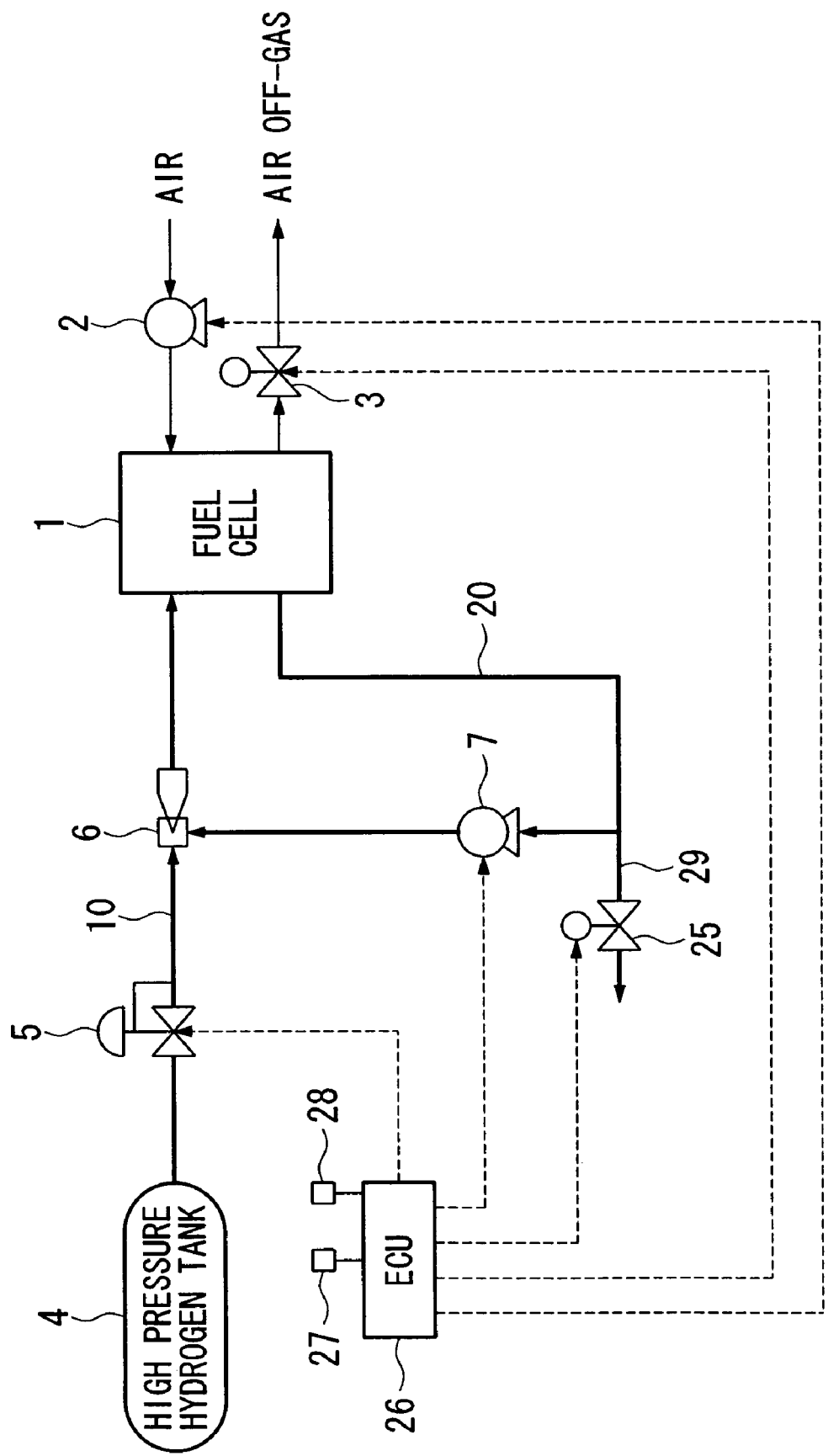
FIG. 1 is schematic constitution diagram showing a first embodiment of the fuel system according to the present invention.

FIG. 1 is schematic constitution diagram showing the fuel system in the first embodiment.

A fuel cell 1 is a stack that is formed by stacking a plurality of fuel cell units, each of which includes a solid polymer electrolyte membrane consisting of, for example, a solid polymer ion exchange membrane, and an anode and a cathode that sandwich the solid polymer electrolyte membrane therebetween. When hydrogen as a fuel gas is supplied to the anode, and air containing oxygen as an oxidizing gas is supplied to the cathode, hydrogen ions are produced in the anode area by catalytic reaction, which pass through the solid polymer electrolyte membrane, and which reach the cathode area where the hydrogen ions electrochemically react with oxygen so that electrical power is generated, and water is produced. Because a portion of the water produced in the cathode area permeates the solid polymer electrolyte membrane so as to diffuse into the anode area, there is also water in the anode area.

Air is pressurized by a compressor 2 to a predetermined pressure, and the pressurized air is supplied to the cathodes of the fuel cell 1. The air is used for power generation, and then the air is discharged as an air off-gas from the cathodes of the fuel cell 1, and is discharged through a pressure control valve 3.

On the other hand, a hydrogen gas supplied from a high pressure hydrogen tank 4 is made to flow through a hydrogen gas supply path 10 that is provided with a pressure control valve 5 and an ejector 6, and the hydrogen gas is supplied to anodes of the fuel cell 1 after it is depressurized to a predetermined pressure by the pressure control valve 5. The ejector 6 is driven by flowing energy of a fluid (a hydrogen gas in this case).

The hydrogen gas supplied to the fuel cell 1 is used for power generation, and then the hydrogen gas is discharged as a hydrogen off-gas from the anodes of the fuel cell 1 to a hydrogen off-gas circulation path 20. The hydrogen off-gas circulation path 20 is connected to a suction side of the ejector 6, and is provided, at a middle portion thereof, with a hydrogen pump 7. The hydrogen pump 7 is driven by a rotating machine, such as an electrical motor or turbine, which generates a rotational force. The hydrogen off-gas discharged from the cathodes of the fuel cell 1 is pressurized by the hydrogen pump 7, and is made to flow into the ejector 6. As a result, the hydrogen off-gas is mixed with a fresh hydrogen supplied from the high pressure hydrogen tank 4, and is resupplied to the anodes of the fuel cell 1.

Moreover, a branch path 29, which is branched off the hydrogen off-gas circulation path 20 at a location upstream with respect to the hydrogen pump 7, is provided with a discharge valve 25. When the discharge valve 25 is closed, the hydrogen off-gas in the hydrogen off-gas circulation path 20 is supplied to the anodes of the fuel cell 1 through the hydrogen pump 7 as explained above. On the other hand, when the discharge valve 25 is opened, the hydrogen off-gas in the hydrogen off-gas circulation path 20 is discharged to the outside of the fuel cell system through the branch path 29 and the discharge valve 25 after being diluted in a gas dilution device (not shown).

The discharge valve 25, hydrogen pump 7, pressure control valves 3 and 5, and compressor 2 are connected to an ECU (Electric Control Device) 26 so as to be controlled by the ECU 26. Moreover, the ECU 26 is also connected to a pump current measuring sensor 27 and a cell voltage measuring sensor 28. The pump current measuring sensor 27 measures consumed electrical current when the hydrogen pump 7 is operated, and the cell voltage measuring sensor 28 measures a voltage of cells that constitute the fuel cell 1. The signals of the electrical current and voltage measured by the sensors 27 and 28 are sent to the ECU 26.

The control operation at starting of the fuel cell system constructed as described above will be explained with reference to FIGS. 4 to 7.

Figure 4:
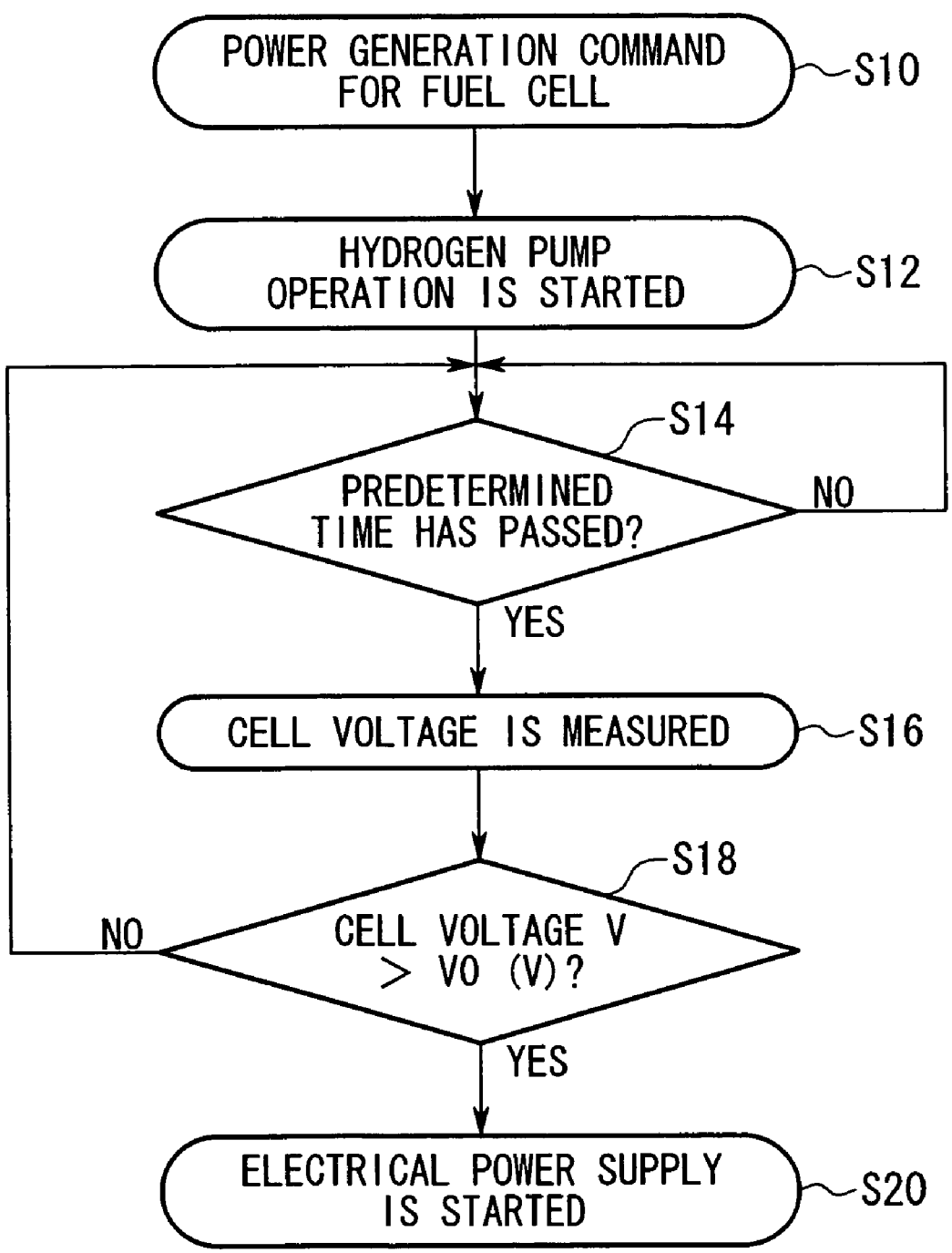
FIG. 4 is a flowchart showing a control operation at starting of the fuel cell system shown in FIG. 1.

FIG. 4 is a flowchart showing the control operation at starting of the fuel cell system shown in FIG. 1. When the ECU 26 detects in step S10 that power generation command for the fuel cell 1 is sent out, the ECU 26 controls the hydrogen pump 7 in step 12 so that the hydrogen pump 7 is started. At this stage, if the discharge valve 25 is open, the ECU 26 controls the discharge valve 25 so as to be closed. As a result, the hydrogen off-gas in the hydrogen off-gas circulation path 20 is pressurized by the hydrogen pump 7 and is made to flow into the ejector 6, and then is supplied to the anodes of the fuel cell 1 via the hydrogen gas supply path 10.

In addition, simultaneously with the control operation in step S12, the ECU 26 operates the compressor 2 so that air is supplied to the cathodes of the fuel cell 1. As a result, power generation is started in each of the cells of the fuel cell 1.

In step S14, it is determined whether a predetermined time has passed. When the result of the determination is "NO", the operation is repeated, and when the result of the determination is "YES", the operation proceeds to step S16. In step S16, cell voltage V (volt) is measured by the cell voltage measuring sensor 28. In step S18, it is determined whether the measured cell voltage V is higher than a predetermined voltage V0 (volt). When the result of the determination is "YES", the operation proceeds to step S20, in which electrical power supply to electronic apparatuses (not shown) that are connected to the fuel cell 1 is started. The result of the determination in step S18 is "NO", the operation returns to step S 14, and the series of the above-mentioned operations is repeated.

As explained above, even when there is no flow in the circulation path 20 at starting of the fuel cell 1, unreacted hydrogen gas contained in the off-gas can be supplied to the fuel cell 1 by operating the fuel pump 7 in a state in which the discharge valve 25 is closed. Moreover, once flow of hydrogen gas is produced in the circulation path 20 by operating the fuel pump 7 in a state in which the discharge valve 25 is closed, it becomes possible to supply the hydrogen off-gas in the circulation path 20 to the hydrogen gas supply path 10 using the ejector 6. As explained above, because the pump 7 is required merely to produce a flow of the hydrogen gas, the pump 7 may be of a small size, and electrical power for operating the pump 7 can be reduced. As a result, even when there is no flow in the circulation path 20 at starting or the like of the fuel cell 1, the hydrogen gas can be efficiently used without being discharged to the outside, and fuel economy can be improved.

Figure 5:
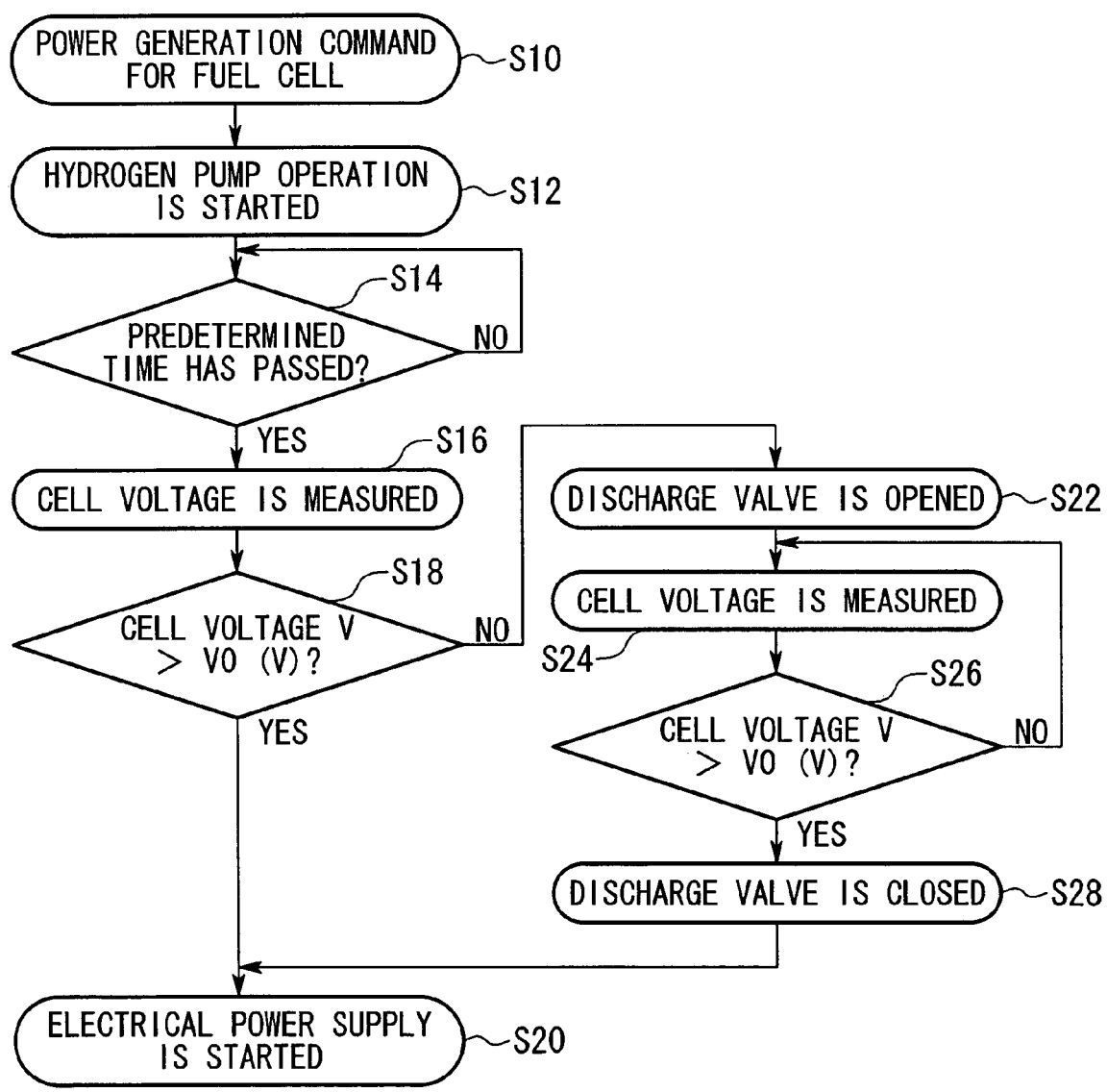
FIG. 5 is a flowchart showing another control operation at starting of the fuel cell system shown in FIG. 1.

FIG. 5 is a flowchart showing another control operation at starting of the fuel cell system shown in FIG. 1. The operations similar to those in FIG. 4 are provided with the same reference numerals as in FIG. 4. In FIG. 5, the operations in steps S10 to S18 and the case in which the result of the determination in step S18 is "YES" are respectively the same as those in FIG. 4; therefore, explanations thereof are omitted.

When the result of the determination in step S18 is "NO" (i.e., the cell voltage V is lower than V0), the operation proceeds to step S22, in which the discharge valve 25 is opened. When the cell voltage V is lower than the predetermined value V0 despite that a predetermined time has passed since starting of power generation, the off-gas is discharged to the outside of the fuel cell system by opening the discharge valve because, in such a case, hydrogen concentration in the hydrogen off-gas is considered to be low.

As in above-mentioned steps S16 and S18, the cell voltage V is measured in step S24, and it is determined in step S26 whether the voltage V is higher than the predetermined value V0. When the result of the determination in step S26 is "NO", the operation returns to step S24 because, in such a case, it is considered that the off-gas containing hydrogen at a low concentration remains in the circulation path 20. In contrast, when the result of the determination in step S26 is "YES", the operation proceeds to step S28, in which the discharge valve 25 is closed because, in such a case, it is considered that the off-gas containing hydrogen at a low concentration has been sufficiently discharged from the circulation path 20. The operation proceeds from step S28 to step S20, in which electrical power supply to electronic apparatuses that are connected to the fuel cell 1 is started.

As explained above, hydrogen concentration in the off-gas can be estimated based on the cell voltage V that is measured by the cell voltage measuring sensor 28, and the discharge valve 25 is opened and closed depending on the estimated hydrogen concentration; therefore, hydrogen contained in the off-gas can be efficiently used, and the pump 7 is operated only when the hydrogen concentration in the off-gas is greater than the predetermined value. Accordingly, electrical power for operating the pump 7 can be saved, and an efficient operation can be achieved.

Figure 6:
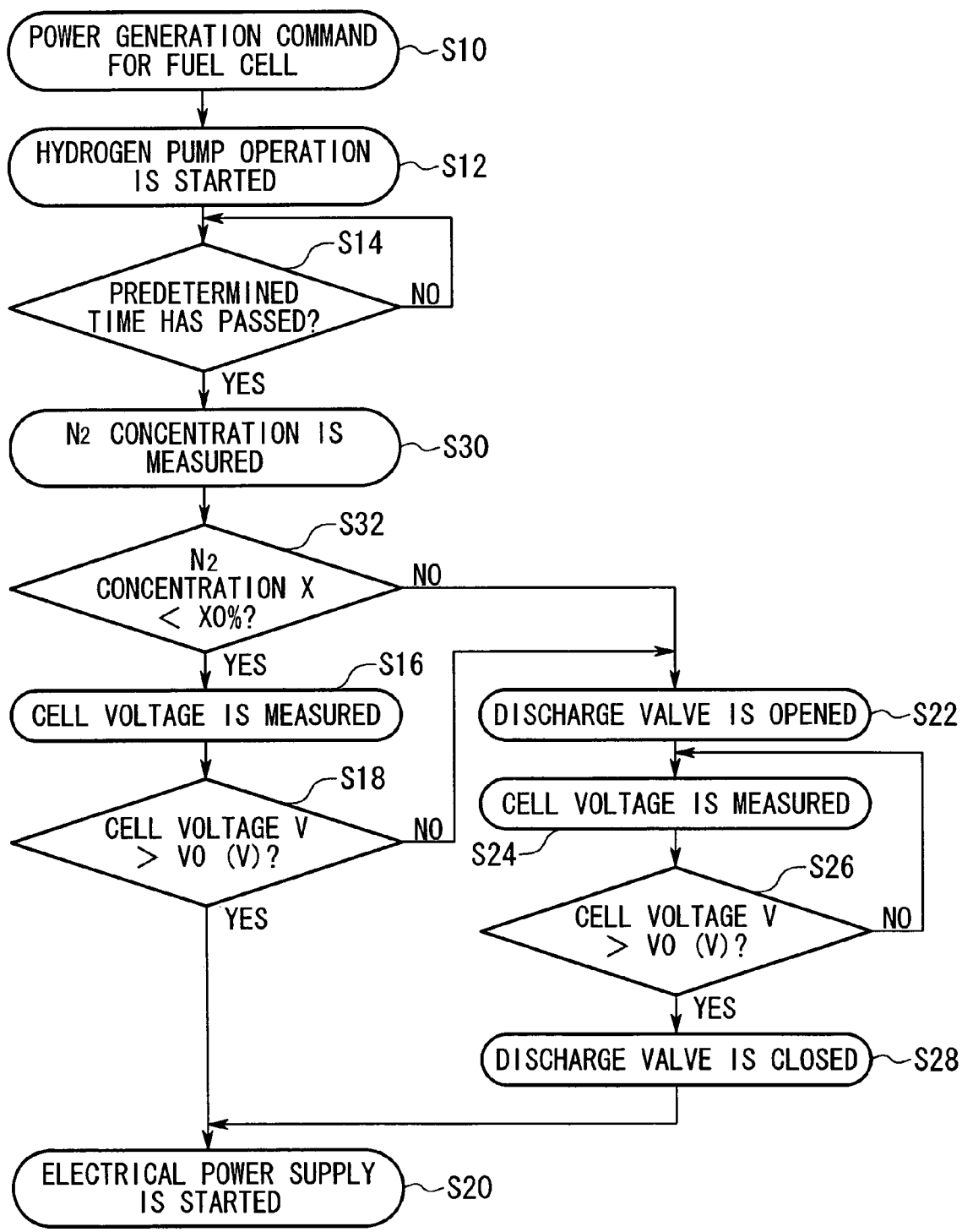
FIG. 6 is a flowchart showing another control operation at starting of the fuel cell system shown in FIG. 1.

FIG. 6 is a flowchart showing another control operation at starting of the fuel cell system shown in FIG. 1. The operations similar to those in FIGS. 4 and 5 are provided with the same reference numerals as in FIGS. 4 and 5. In FIG. 6, the operations in steps S10 to S14 are respectively the same as those in FIG. 4; therefore, explanations thereof are omitted.

Figure 7:
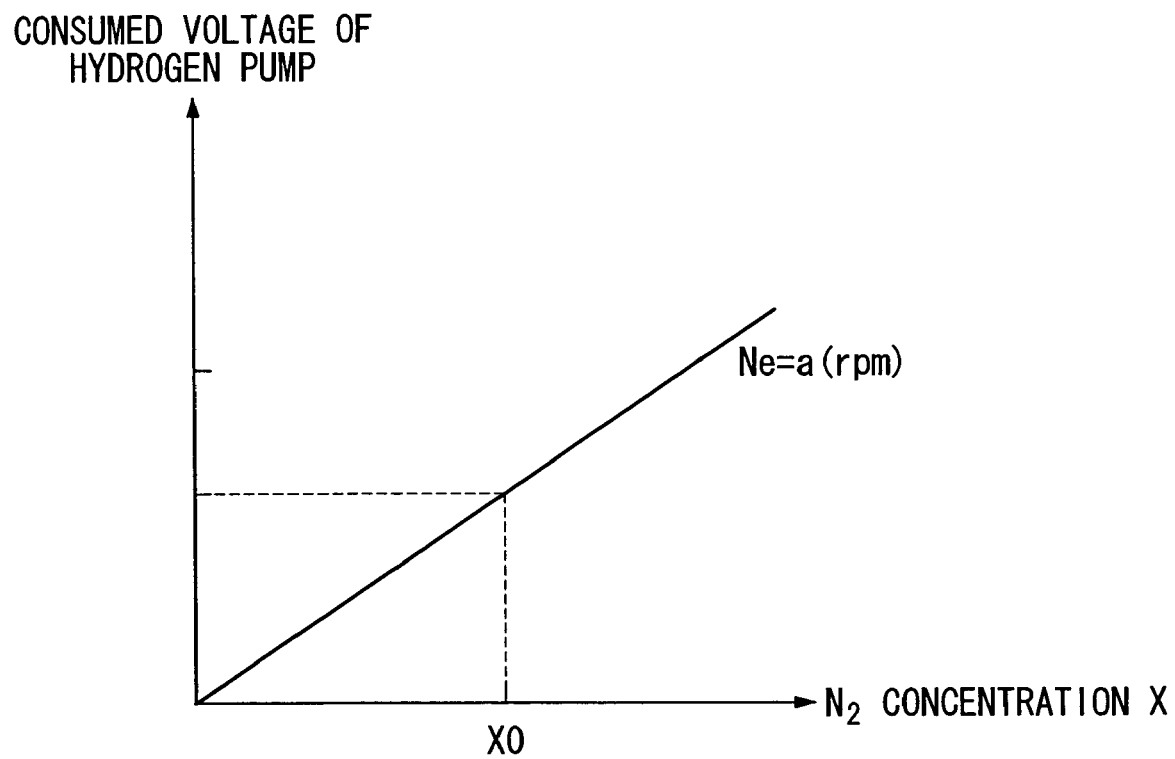
FIG. 7 is a graph showing the relationship, which is used in the control operation shown in FIG. 6, between concentration of nitrogen and electrical current consumed by a hydrogen pump.

When the result of the determination in step S14 is "YES" (i.e., it is determined that a predetermined time has passed), nitrogen concentration in the off-gas is calculated in step S30. The calculation of the nitrogen concentration is performed based on the electrical current being consumed by the hydrogen pump 7 in operation. FIG. 7 is a graph showing the relationship, which is used in the control operation shown in FIG. 6, between the nitrogen concentration and electrical current consumed by the hydrogen pump. As shown in FIG. 7, when assuming that the revolution rate Ne of the hydrogen pump 7 is constant (e.g., at revolution rate "a" rpm), electrical current consumed by the hydrogen pump 7 is substantially in proportion with the nitrogen concentration in the off-gas. This is because the specific gravity of nitrogen is greater than that of hydrogen, and the workload required to rotate the hydrogen pump 7 at a specific revolution rate varies depending on the nitrogen concentration in the off-gas. Accordingly, by measuring electrical current consumed by the hydrogen pump 7 using the pump current measuring sensor 27 in a state in which the revolution rate is constant, it is possible to calculate nitrogen concentration X using FIG. 6.

In step S32, it is determined whether the nitrogen concentration X calculated as explained above is less than a predetermined value X0%. When the result of the determination is "YES", the operation proceeds to step S16, in which the cell voltage V is measured because, in such a case, it is considered that hydrogen is sufficiently contained in the off-gas. The operations after step S16 are the same as those in FIG. 5; therefore, the explanations thereof are omitted.

In contrast, the result of the determination in step S32 is "NO", the operation proceeds to step S22, in which the discharge valve is opened because, in such a case, it is considered that the nitrogen concentration is high, and only a little hydrogen is contained in the off-gas. The operations after step S22 are the same as those in FIG. 5; therefore, the explanations thereof are omitted.

As explained above, the concentration of an impure gas (gas other than the fuel gas, which mainly includes a nitrogen gas) in the hydrogen off-gas can be estimated depending on the state-of-load of the hydrogen pump 7 (in this case, consumed electrical current) measured by the state-of-load measuring device. As a result, by controlling the discharge valve 25 so as to be opened when the concentration of the impure gas calculated based on the state-of-load of the hydrogen pump 7 reaches a predetermined concentration, the off-gas having the impure gas at a high concentration can be purged, and by the purging operation, high load state of the hydrogen pump 7 due to the impure gas can be reduced, and the hydrogen pump 7 can be preferably protected.

Figure 2:
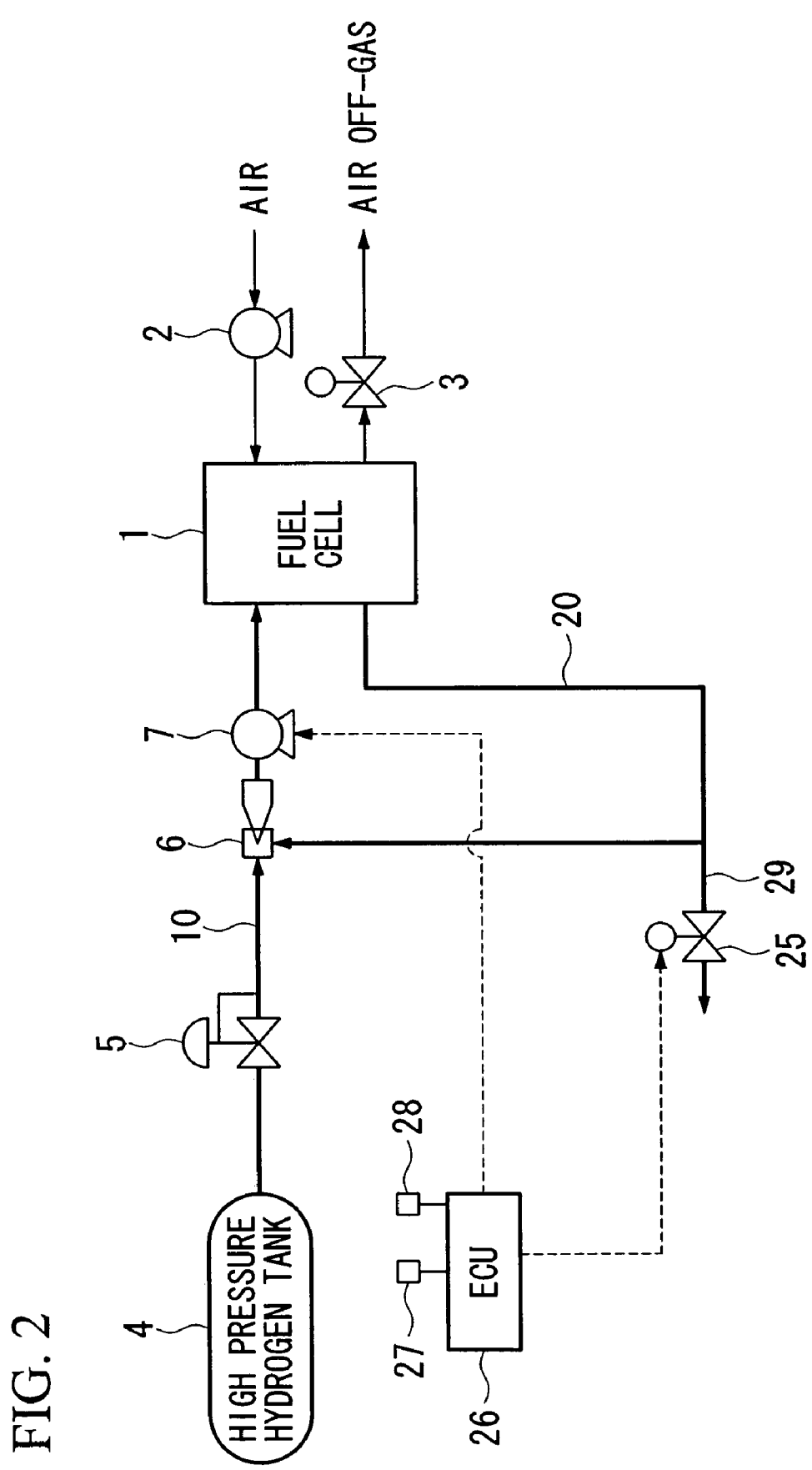
FIG. 2 is schematic constitution diagram showing a second embodiment of the fuel system according to the present invention.
Figure 3:
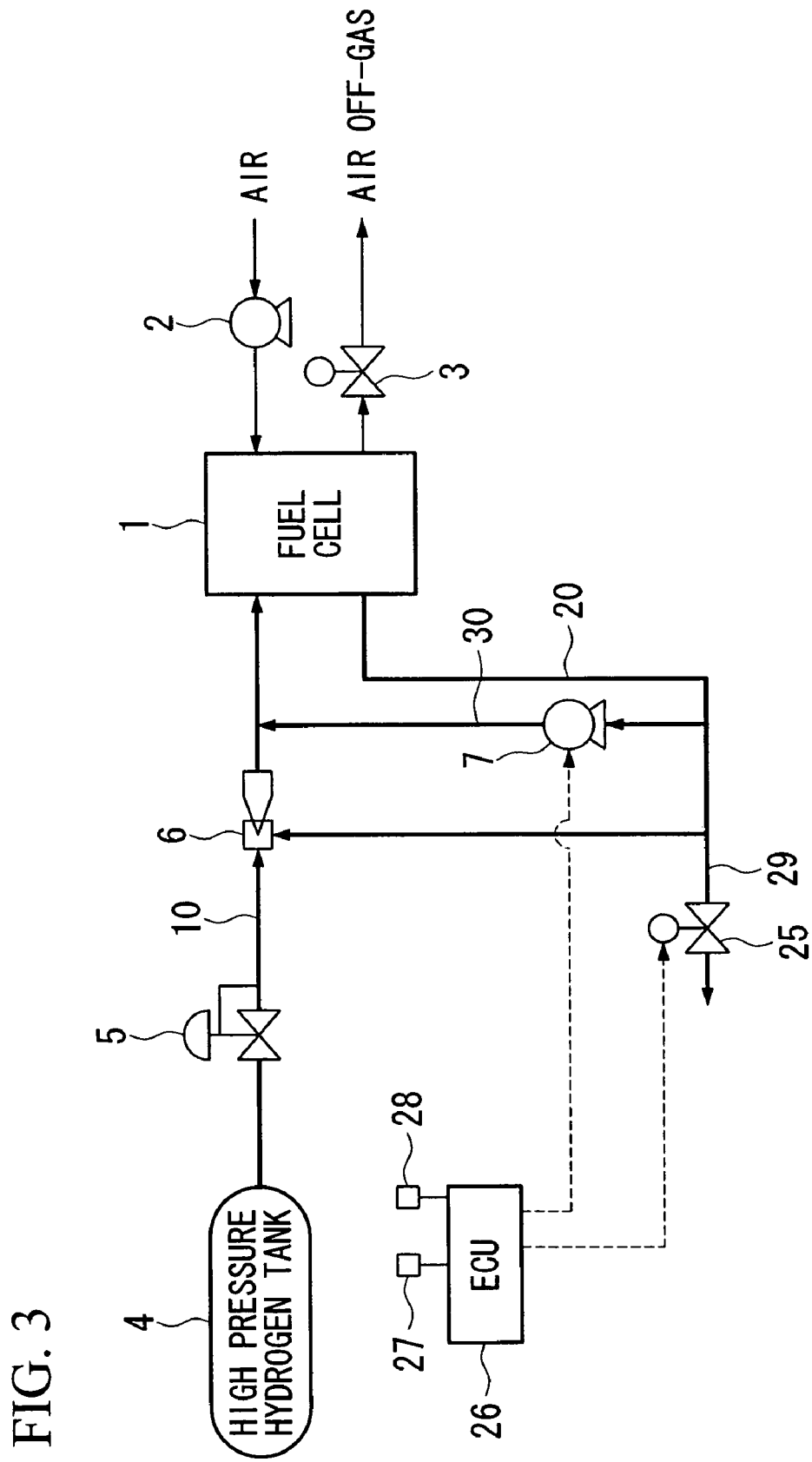
FIG. 3 is schematic constitution diagram showing a third embodiment of the fuel system according to the present invention.

The fuel cell system is not limited to the above-described one, and, for example, constitutions shown in FIGS. 2 and 3 may be employed. FIGS. 2 and 3 are schematic constitution diagrams showing second and third embodiments that differ from the fuel cell system shown in FIG. 1. As shown in FIGS. 2 and 3, the hydrogen pump 7 may be provided in the hydrogen gas supply path and downstream of the ejector 6. A bypass path 30 connecting the paths 20 and 10 at downstream of the ejector 6 may be provided, and the hydrogen pump 7 may be provided in the bypass path 30. In the above-described embodiments, hydrogen is used as fuel; however, other fuels may also be used.

Advantageous Effects Obtained by the Invention

As explained above, according to the fuel cell system of the present invention, even at starting of the fuel cell, the fuel gas can be efficiently used without being discharged to the outside, and fuel economy can be improved.

According to another fuel cell system of the present invention, the fuel contained in the off-gas can be efficiently used, and an efficient operation by which electrical power required to operate the pump is reduced can be achieved.

According to another fuel cell system of the present invention, the off-gas having an impure gas at a high concentration can be purged, and the fuel pump can be preferably protected.

According to an operation method for a fuel cell system of the present invention, useless discharge of the fuel due to flow in the circulation path produced by opening the discharge valve can be avoided, and the fuel can be efficiently used. By applying this method to a vehicle provided with the fuel cell system, fuel economy can be improved due to efficient use of fuel.

What is claimed is:

1. A fuel cell system comprising:
   a fuel cell for generating power by being supplied with a fuel gas and an oxidizing gas;
   a fuel gas supply path for supplying a fuel gas to the fuel cell;
   a fuel off-gas circulation path for returning a fuel off gas discharged from the fuel cell to the fuel gas supply path;
   an ejector, provided in the fuel gas supply path and driven by fluid flow energy, for supplying the fuel off gas in the fuel off gas circulation path to the fuel gas supply path;
   a fuel pump, provided in the fuel off-gas circulation path or on the fuel gas supply path and downstream with respect to the ejector, and driven by a rotating machine, for pressurizing the fuel off-gas;
   a discharge valve for discharging the fuel off-gas from the fuel off-gas circulation path; and
   a control device programmed to close the discharge valve and operate the fuel pump upon start up of the fuel cell.

2. A fuel cell system according to claim 1, further comprising:
   a voltage measuring device, connected to the control device, for measuring voltage of cells constituting the fuel cell,
   wherein the control device controls the discharge valve so as to be opened if the voltage of the cells measured by the voltage measuring device at start up of the fuel cell is lower than a predetermined value.

3. A fuel cell system according to claim 1, further comprising:
   a state-of-load measuring device, connected to the control device, for measuring a state-of-load of the fuel pump,
   wherein the control device controls the discharge valve so as to be opened if the state-of-load measured by the state-of-load measuring device at start up of the fuel cell is greater than a predetermined value.

4. A fuel cell system according to claim 1, further comprising:
   a state-of-load measuring device, connected to the control device, for measuring a state-of-load of the fuel pump,
   wherein the control device controls the discharge valve so as to be opened if the state-of-load measured by the state-of-load measuring device is greater than a predetermined value when a predetermined time has passed since the fuel cell is started.

5. A fuel cell system according to claim 1, further comprising:
   a voltage measuring device, connected to the control device, for measuring voltage of cells constituting the fuel cell,
   wherein the control device is configured to control the discharge valve so as to be opened if the voltage of the cells measured by the voltage measuring device is lower than a predetermined value when a predetermined time has passed since the fuel cell is started.

* * * * *